Jan. 5, 1960 C. E. BRANICK 2,919,893
SCREW TYPE TIRE SPREADER

Filed Aug. 4, 1958 4 Sheets-Sheet 1

INVENTOR.
CHARLES E. BRANICK
BY
ATTORNEYS

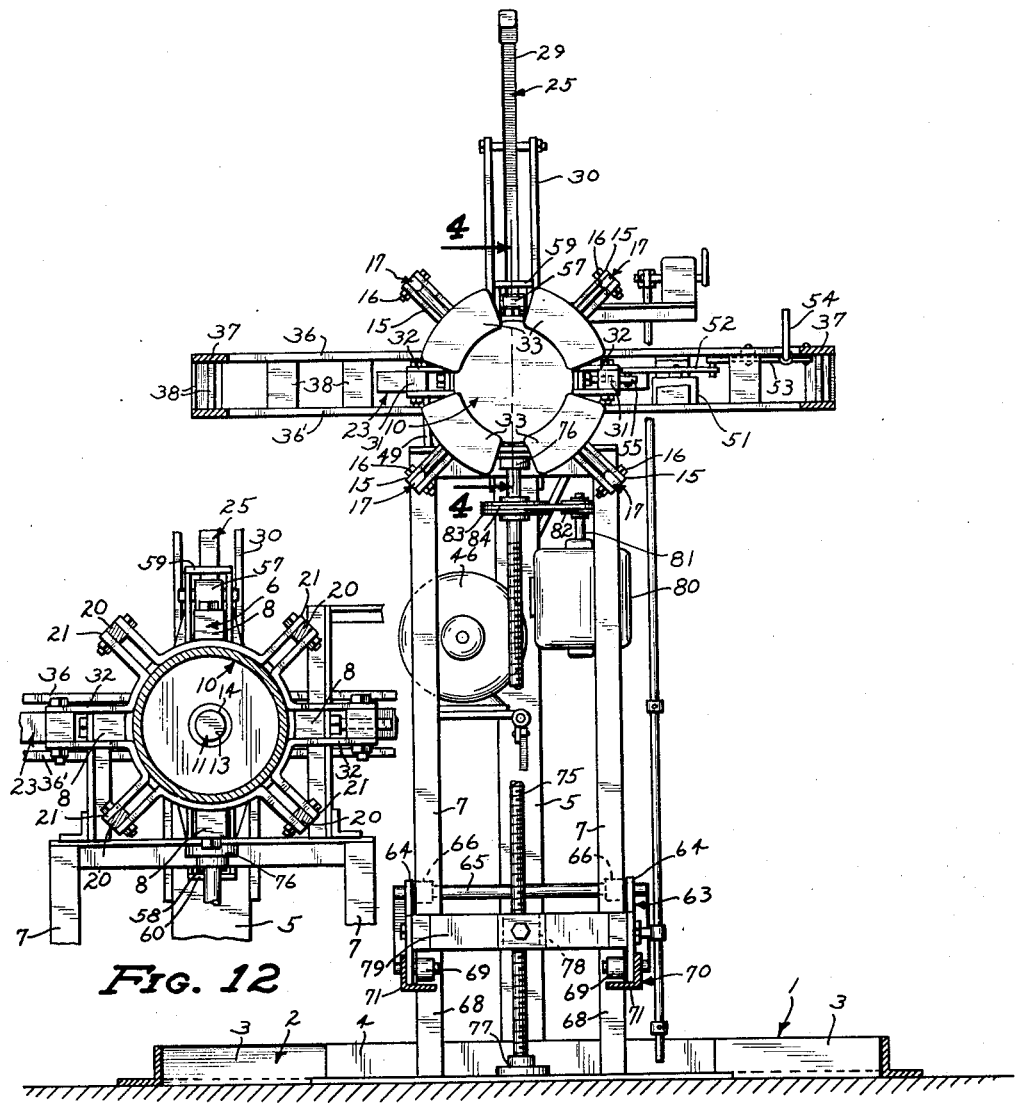
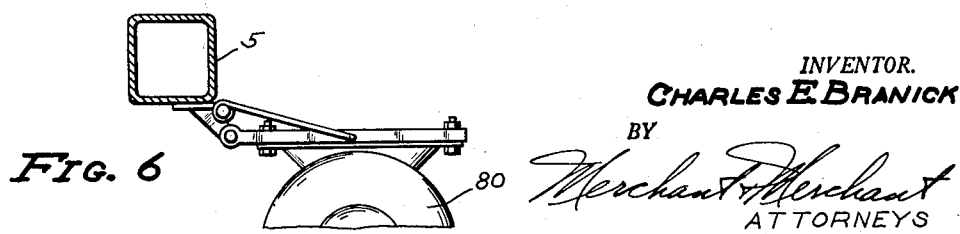

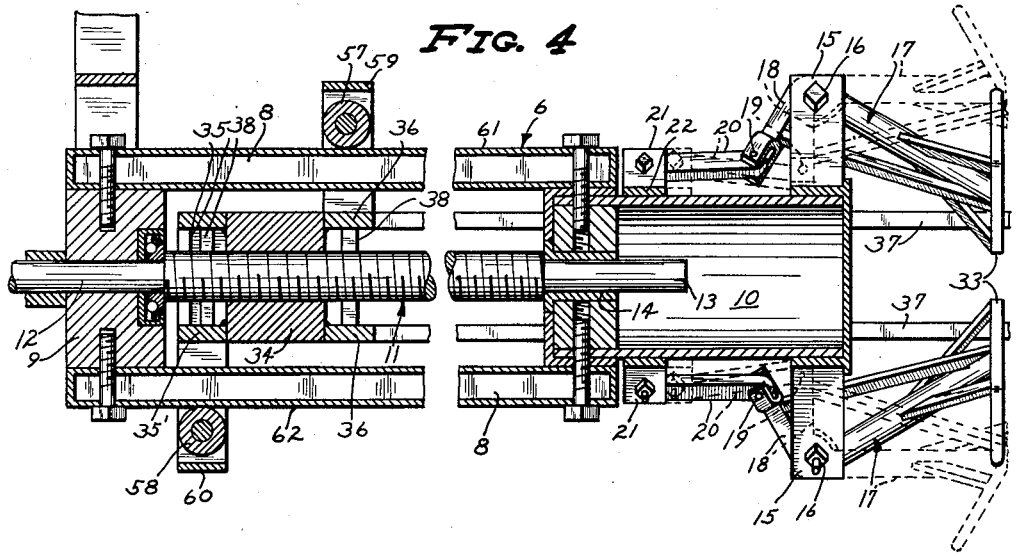
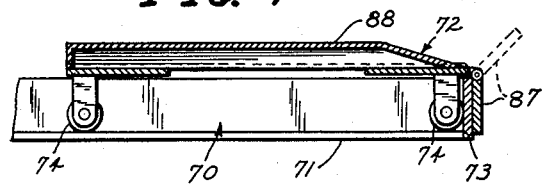
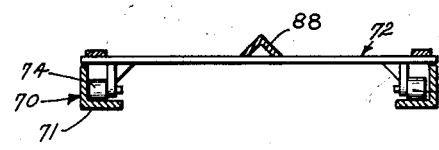
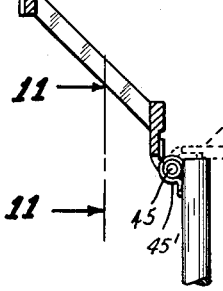
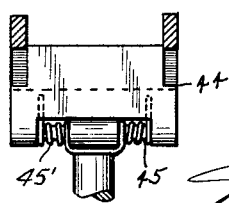
INVENTOR.
CHARLES E. BRANICK
BY
ATTORNEYS United States Patent Office 2,919,893
Patented Jan. 5, 1960

2,919,893
SCREW TYPE TIRE SPREADER

Charles E. Branick, Fargo, N. Dak.

Application August 4, 1958, Serial No. 753,024

2 Claims. (Cl. 254—50.4)

My invention relates generally to pneumatic tire spreaders and more particularly to improvements in screw type tire spreaders.

The primary object of my invention is the provision of a pneumatic tire spreader, the spreader arms of which are mechanically, as distinguished from pneumatically or hydraulically operated, and which by virtue thereof serves to maintain a tire in any given spread position for indefinite periods of time.

A further object of my invention is the provision of a device of the class immediately above described which provides a maximum of safety in its operation.

A further object of my invention is the provision of a device of the class described which is not unduly expensive to produce, which is highly efficient and positive in its action, and which is rugged and durable in construction.

A further object of my invention is the provision of novel mechanism for lifting of relatively heavy tire casings to and from the spreader arms thereof.

The above and still further objects of my invention will become apparent from the following detailed specification, appended claims and attached drawings.

Referring to the drawings wherein like characters indicate like parts throughout the several views:

Fig. 3 is a view partly in section and partly in front elevation as seen from the line 3—3 of Fig. 2, some parts being broken away;

Fig. 4 is an enlarged sectional view taken substantially on the line 4—4 of Fig. 3, some parts being broken away;

Fig. 5 is an enlarged view in vertical section as seen from the line 5—5 of Fig. 1;

Fig. 6 is an enlarged fragmentary view taken substantially on the line 6—6 of Fig. 1;

Fig. 7 is an enlarged fragmentary view in vertical section as seen from the line 7—7 of Fig. 2;

Fig. 8 is a view in vertical section as seen from the line 8—8 of Fig. 2;

Fig. 9 is an enlarged view of one of the spreader arms of my novel device, some parts being broken away;

Fig. 10 is a fragmentary sectional view taken on the line 10—10 of Fig. 9;

Fig. 11 is a view partly in section and partly in elevation as seen from the line 11—11 of Fig. 10; and Fig. 12 is a view partly in vertical section and partly in front elevation as seen from the line 12—12 of Fig. 1, some parts being broken away.

Figure 1:
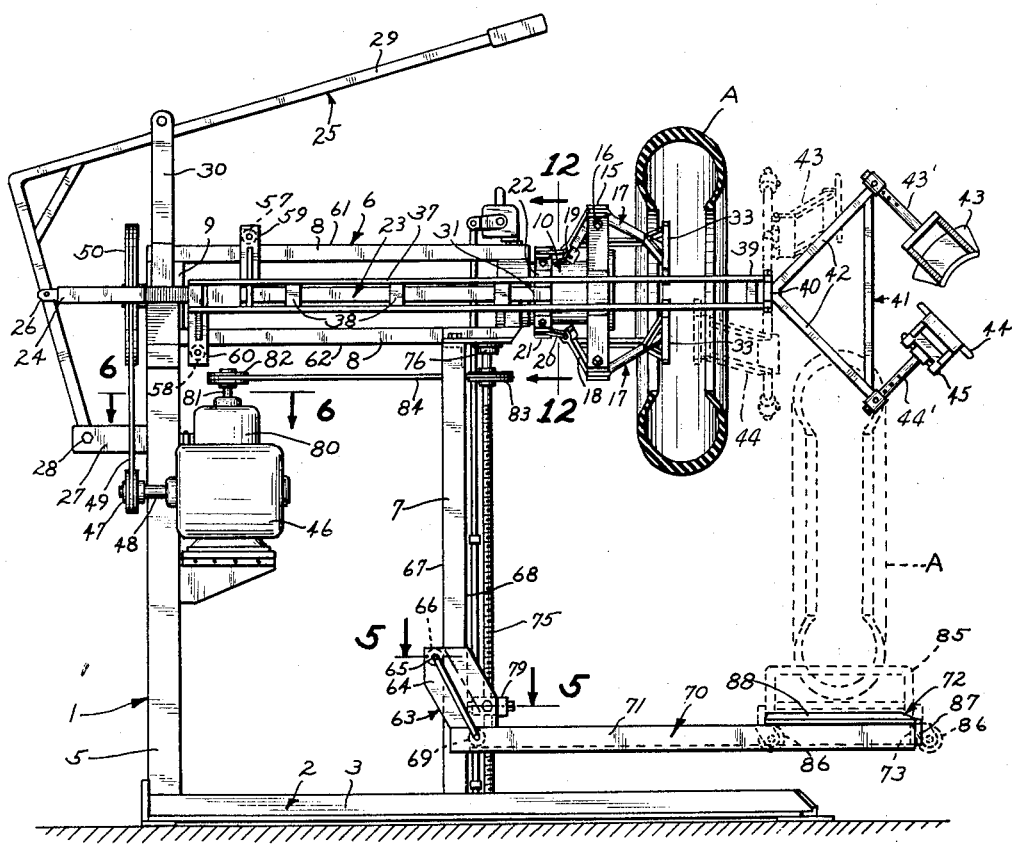
Fig. 1 is a view in side elevation of my novel structure, the tire thereon being shown in section.

Referring with greater particularity to the drawings, the numeral 1 indicates in its entirety a supporting frame structure including a floor engaging base frame element 2 comprising forwardly diverging floor engaging members 3 preferably formed from conventional angle iron stock for purposes of rigidity. The rear end portions of the members 3 are secured together, whereas the intermediate portions thereof are connected by a rigid tie member 4. Projecting upwardly from the connected rear end portions of the members 3 and rigid therewith is a mounting post 5 to the upper end portion of which is rigidly mounted a super frame structure 6 which projects forwardly in generally overlying relationship to the base frame element 2. Rigidly interposed between the forward end portion of the super frame structure 6 and the tie member 4 are a pair of upstanding laterally spaced parallel guide rails 7, shown as being formed from conventional channel iron stock. The function of the guide rails 7 will hereinafter be explained. It suffices at this point to state that they impart great overall rigidity to the frame structure 1.

The super frame structure 6 includes a plurality of circumferentially spaced, shown as being four in number, parallel tubular cross-sectionally rectangular frame members 8. The rear end portions of the frame members 8 are secured together through the medium of a bearing block 9, whereas the forward end portions thereof are secured together by a tubular mounting head 10. Extending axially of the frame members 8 is a screw 11 which has its reduced rear end 12 journaled for rotation in the bearing block 9 and its reduced forward end 13 journaled for rotation in the rear end of the tubular mounting head 10, as indicated at 14.

Rigidly secured to and projecting radially outwardly from the forward end portion of the tubular mounting head 10 in circumferentially spaced relationship, are a plurality of mounting brackets 15 between the bifurcated outer end portions of which are journaled, as indicated at 16, the intermediate portions of conventional tire bead engaging spreader arms 17. The rear end portions 18 of the spreader arms 17 are pivotally connected, as indicated at 19, to the forward ends of circumferentially spaced links 20. The links 20 have their rear ends pivotally secured one each to a circumferentially spaced ear 21 carried by and projecting radially outwardly from a collar 22 mounted for longitudinal sliding movements on the mounting head 10.

Figure 2:
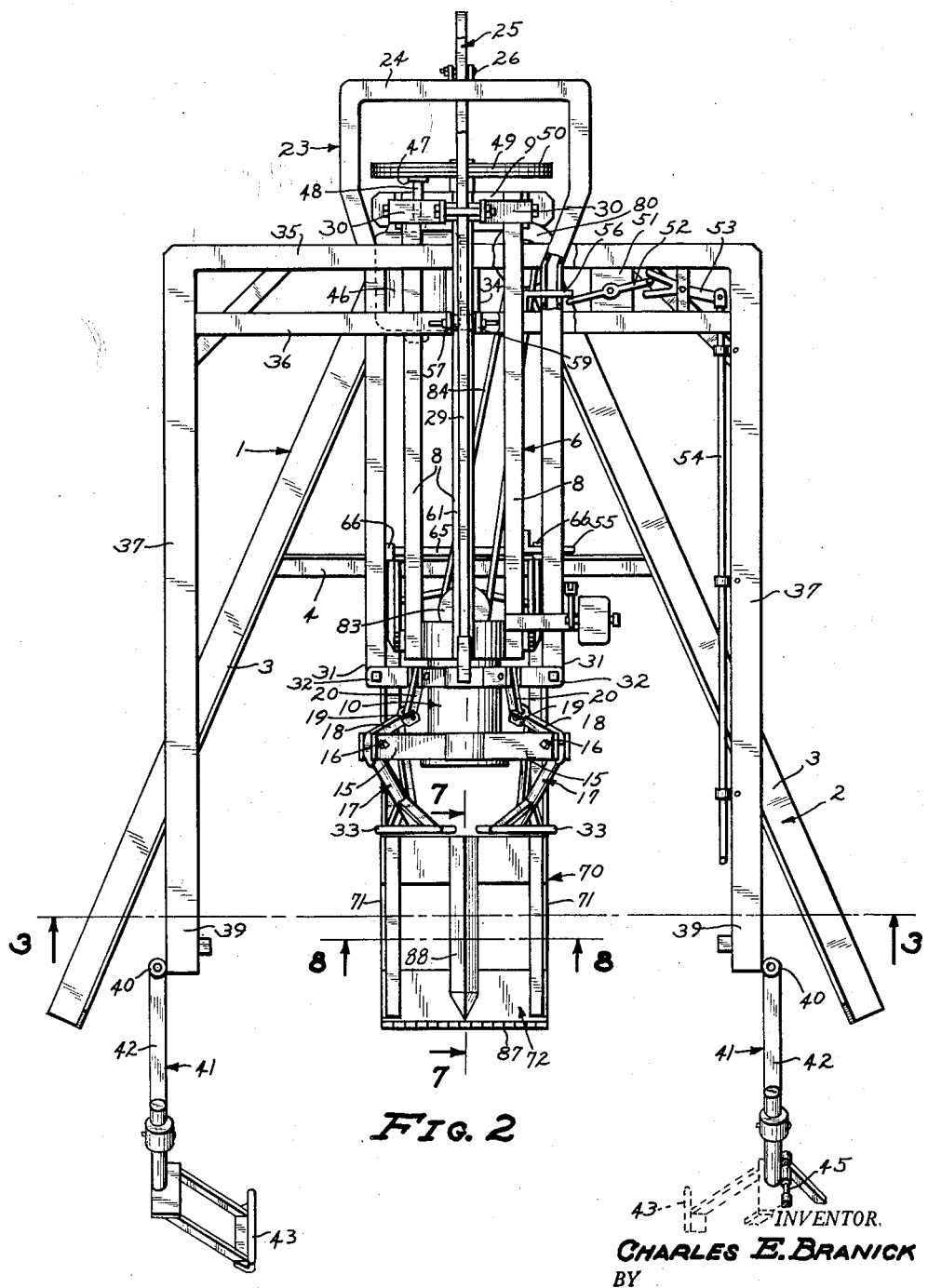
Fig. 2 is a view in top plan on a slightly enlarged scale.

As shown particularly in Fig. 2, a generally horizontally disposed yoke 23 has its closed rear end 24 pivotally secured to the intermediate portion of an angular lever 25, as indicated at 26. The lower end portion of the lever 25 is pivoted to a bracket 27 projecting rearwardly from the mounting post 5, as indicated at 28; whereas the generally horizontal handle-equipped forwardly projecting end portion 29 is loosely received between laterally spaced upwardly projecting guide elements 30. The forward end portions of the laterally spaced arms 31 of the yoke 23 are rigidly secured one each to elongated ears 32 projecting radially outwardly from opposite sides of the slide collar 22.

From the above, it should be clear that when rearward upward swinging movements, about the horizontal axis 28, are imparted to the lever 25, simultaneous rearward movements are imparted to the yoke 23, the slide collar 22 and the links 20, whereby to cause the forwardly projected free ends of the spreader arms 17 to assume the contracted full line position of Fig. 4. By the same token, downward and forward movements imparted to the lever 25, through engagement of the handle-equipped upper end portion 29 thereof, will cause forward movements to be imparted to the yoke 23, collar 22 and links 20, whereby to cause the extended ends of the spreader arms 17 to assume their expanded dotted line positions of Fig. 4 wherein radially projected ends 33 are caused to be received within the tire casing A mounted thereon and positively limit said tire casing against forward movements during spreading of the opposite side wall thereof by cooperating opposed spreader arms just now to be described.

Mounted for axial movements on the screw 11 between the bearing block 9 and the rear end portion of the tubular head 10 is a traveller block or head 34. Rigidly secured to, as by welding or the like, for common movement with the traveller block 34 are longitudinally spaced rigid bars 35 and 36 which, as shown, comprise vertically spaced bar elements 35' and 36' respectively which project laterally outwardly in opposite directions. Rigidly secured to and projecting forwardly from the rigid bars 35 and 36 in the relatively widespread parallel relationship indicated particularly by Fig. 2 are a pair of rigid arms 37, shown particularly in Figs. 1 and 4 as being bifurcated, and said bifurcations being rigidly connected together at longitudinally spaced points by rigid vertically extended straps 38. As shown particularly in Fig. 1, the projected forward ends 39 of the arms 37 terminate forwardly of the spreader arms 17 and a tire casing A mounted thereon, on opposite sides of said tire casing A.

Pivotally secured to the extended ends 39 of the arms 37, on vertical axes 40, are bifurcated spreader arms, identified in their entireties by the numeral 41 and comprising arm sections 42 which diverge in a vertical plane. As shown particularly in Figs. 1 and 9, a pair of circumferentially spaced bead-engaging hook elements 43 and 44 associated with each of the bifurcated spreader arms 41 are mounted for slideable adjustments radially of a common axis as indicated by 43' and 44' respectively. The longitudinal adjustments are required for use of the device with tires of varying rim size.

Preferably, one of the hook elements associated with each of the bifurcated spreader arms 41, shown as being the hook elements 43 and 44, is mounted for swinging movements about an axis 45 generally normal to the direction of sliding movements thereof, coil tension spring 45' yieldingly biasing same toward their inoperative positions, see full lines in Fig. 10.

When it is desired to spread apart the side walls of the tire casing A suitably mounted on the spreader arms 17 for the purpose of inspection or the like, the bifurcated spreader arms 41 are swung toward each other on the vertical axes 40 and the non-pivoted hook elements 43 are caused to engage the forwardly disposed tire bead, after proper longitudinal adjustments have been imparted thereto. Thereafter, the pivoted hook elements 44 are swung into engagement with said bead and forward spreading movements are imparted to the bifurcated arms 41. Preferably and as shown, this movement is accomplished through the medium of an electric motor 46 suitably mounted on the frame structure 1. A conventional V-pulley 47 fast on the drive shaft 48 of the motor 46 has a V-belt or the like 49 entrained thereon. The belt 49 is likewise also entrained over a larger driven pulley 50 fast on the extended reduced rear end 12 of the screw 11, as shown particularly in Figs. 1 and 2. Starting and stopping and reverse actions are imparted to the electric motor 46 through any suitable switch mechanism, not shown but contained within a housing 51 and operated by means of a switch-operated arm 52, one end of which is engaged by the bifurcated lever 53 carried by the traveller block 34 and parts 35, 36 and 37 carried thereby. The opposite end of the lever 53 is pivotally connected to one end of a control rod 54 mounted for sliding movements on one of the arms 37. The inner end of the switch operated arm 52 is engageable with forwardly and rearwardly disposed stop fingers 55 and 56 respectively rigid on the super frame structure 6 to cause opening of the switch within the housing 51 to stop forward or rearward movement of the traveller block 34 and parts carried thereby.

Preferably and as shown particularly in Figs. 1 and 4, stability is imparted to the arms 37 through the medium of forwardly and rearwardly disposed roller elements 57 and 58 respectively that are journaled in respective brackets 59 and 60, the former rigidly secured to and carried by the bar 36 and the latter carried by the bar 35'.

As shown particularly in Fig. 4, the forwardly disposed roller 57 rides upon the upper surface 61 of the uppermost one of the cross-sectionally rectangular tubular frame members 8; whereas the roller 58 underlies and engages the bottom surface 62 of the lowermost one of the frame members 8.

Another and equally important phase of my invention relates to the novel mechanism for raising and lowering a tire casing A with respect to the spreader arms 37, 41. This mechanism comprises a carriage identified in its entirety by the numeral 63 and comprising vertically spaced side plates 64, one on each side of one of the spaced guide rails 7. Extending transversely of and rigidly connected to the side plates 64 rearwardly of the guide rails 7 is a shaft 65 upon which are mounted spaced rollers 66, one each having rolling engagement with the rear surface 67 of one of the guide rails 7. Mounted for rotation in said side plates 64, below the plane of the rollers 66 and engageable with the forward surfaces 68 of the guide rails 7 are a pair of opposed rollers 69. Rigidly carried by the carriage 63 and projecting forwardly therefrom in underlying relationship to the spreader arms 17, 41, is a horizontally disposed lifting arm 70. As shown particularly in Fig. 8, the lifting arm 70 comprises a pair of laterally spaced opposed arm elements 71, shown as being angular in cross section so as to serve as guides for a tire supporting platform identified in its entirety by the numeral 72 and mounted thereon for movements between stop elements 73 on their extended forward ends, and the carriage 63. The rollers associated with the mobile platform 72 are identified by the numeral 74.

Means for raising and lowering the carriage 63 and arm 70 carried thereby comprises a screw element 75 suitably journaled at its upper end in the super frame structure 6, as indicated at 76, and at its lower end in a floor engaging foot element 77. The intermediate portion of the screw 75 has threaded engagement with a traveller 78 which, in turn, is rigidly secured to the carriage 63 through members 79, as shown particularly in Fig. 5. Starting, stopping and reverse movements are imparted to the screw 75 through the medium of switching mechanism, not shown in detail, associated with an electric motor 80 having a drive shaft 81 upon which is mounted a sheave 82. Entrained over the sheave 82 and a driven sheave 83 on the upper end portion of the screw 75 is a conventional V-belt or the like 84.

To transport the tire casing A from a given position on a floor to the spreader arms 17, 41, I preferably provide a wheel-equipped dolly 85 shown by dotted lines in Fig. 1. The rollers 86 of the dolly 85 are of sufficient height and are spaced apart sufficiently so as to enable the dolly 85 to straddle the forward end of the arm 70 in overlying relationship to the mobile platform 72, when the platform 72 is moved into engagement with the stop element 73, as shown in Fig. 7. To positively retain the platform 72 in this dolly-receiving position, I provide the front end portion of the platform 72 with a horizontally pivoted bar-like barrier element 87. The full line position of Fig. 7 indicates its locking position in engagement with the stop elements 73; whereas the dotted line position thereof indicates its platform releasing position when it is desired to move the tire casing from the spaced vertical planes represented by the dotted and full line positions of Fig. 1. For purposes of securely anchoring together the dolly 85 and the platform 72 during lifting movements thereof, I preferably provide the intermediate portion of the platform 72 with a longitudinally extended upstanding rib 88 which makes line contact with the undersurface of the dolly and as such limits lateral movements thereof with respect to the platform 72.

My invention has been thoroughly tested and found to be completely satisfactory for the accomplishment of the above objects and while I have shown a preferred embodiment thereof I wish it to be specifically understood that same is capable of modification without departure from the scope and spirit of the appended claims.

What I claim is:

1. In a device of the class described, frame structure including a floor-engaging base frame element, a pair of cooperating heads each carrying a plurality of circumferentially spaced tire bead-engaging spreader arms thereon, means mounting said heads in said frame structure for relative movements of the spreader arms carried thereby toward and away from each other in a horizontal plane generally overlying said base frame element, a guide rail extending upwardly from said base frame element rearwardly of said heads, a carriage mounted for raising and lowering movements on said guide rail and having a generally horizontally disposed lifting arm which underlies said heads and terminates forwardly of said heads, a tire supporting platform mounted for longitudinal movements on said arm, and stop means limiting forward movements of said supporting platform with respect to said lifting arm.

2. The structure defined in claim 1 in further combination with means on said supporting platform engageable under the action of gravity with an extended end portion of said lifting arm to limit rearward movements of said supporting platform when said supporting platform is moved into engagement with said stop means.

References Cited in the file of this patent

UNITED STATES PATENTS

| | | |
|---|---|---|
| 1,848,961 | Manley | Mar. 8, 1932 |
| 2,347,311 | Branick | Apr. 25, 1944 |
| 2,665,108 | Branick | Jan. 5, 1954 |
| 2,872,704 | Schaevitz | Feb. 10, 1959 |